United States Patent
Saragih et al.

(10) Patent No.: US 10,885,693 B1
(45) Date of Patent: Jan. 5, 2021

(54) ANIMATING AVATARS FROM HEADSET CAMERAS

(71) Applicant: Facebook Technologies, LLC, Menlo Park, CA (US)

(72) Inventors: Jason Saragih, Pittsburgh, PA (US); Shih-En Wei, Pittsburgh, PA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/449,117

(22) Filed: Jun. 21, 2019

(51) Int. Cl.
| | |
|---|---|
| *G06T 13/40* | (2011.01) |
| *G06T 7/00* | (2017.01) |
| *G06T 7/70* | (2017.01) |
| *G06T 1/20* | (2006.01) |
| *H04N 5/247* | (2006.01) |

(52) U.S. Cl.
CPC ............ *G06T 13/40* (2013.01); *G06T 1/20* (2013.01); *G06T 7/70* (2017.01); *G06T 7/97* (2017.01); *G06T 2207/10048* (2013.01); *G06T 2207/20081* (2013.01); *G06T 2207/20084* (2013.01); *G06T 2207/30201* (2013.01); *H04N 5/247* (2013.01)

(58) Field of Classification Search
CPC .. G06T 13/40; G06T 7/97; G06T 7/70; G06T 1/20; G06T 2207/10048; G06T 2207/20081; G06T 2207/30201; H04N 5/247
See application file for complete search history.

(56) References Cited

U.S. PATENT DOCUMENTS

| | | | |
|---|---|---|---|
| 2017/0091535 A1* | 3/2017 | Yu ..................... | G06K 9/00281 |
| 2017/0243387 A1* | 8/2017 | Li ...................... | G06K 9/00281 |
| 2019/0147642 A1* | 5/2019 | Cole .................. | G06K 9/00214 |
| | | | 345/419 |

OTHER PUBLICATIONS

Bozorgtabar, Behzad, et al. "Using photorealistic face synthesis and domain adaptation to improve facial expression analysis." 2019 14th IEEE International Conference on Automatic Face & Gesture Recognition (FG 2019). IEEE, 2019. (Year: 2019).*

Vlasic, D., Brand, M., Pfister, H., & Popovic, J. (2006). Face transfer with multilinear models. In ACM SIGGRAPH 2006 Courses (pp. 24-es). (Year: 2006).*

(Continued)

*Primary Examiner* — Daniel F Hajnik
(74) *Attorney, Agent, or Firm* — Baker Botts L.L.P.

(57) ABSTRACT

In one embodiment, a computing system may access a plurality of first captured images that are captured in a first spectral domain, generate, using a first machine-learning model, a plurality of first domain-transferred images based on the first captured images, wherein the first domain-transferred images are in a second spectral domain, render, based on a first avatar, a plurality of first rendered images comprising views of the first avatar, and update the first machine-learning model based on comparisons between the first domain-transferred images and the first rendered images, wherein the first machine-learning model is configured to translate images in the first spectral domain to the second spectral domain. The system may also generate, using a second machine-learning model, the first avatar based on the first captured images. The first avatar may be rendered using a parametric face model based on a plurality of avatar parameters.

20 Claims, 10 Drawing Sheets

(56) References Cited

OTHER PUBLICATIONS

International Search Report and Written Opinion for International Application No. PCT/US2020/036407, dated Sep. 4, 2020.
Limmer, et al., Infrared Colorization Using Deep Convolutional Neural Networks, ArXir:1604.02245V3, XP055434299, pp. 1-8, Jul. 26, 2016.
Olszewski, et al., High-fidelity Facial and Speech Animation for VR HMDs, ACM Transactions on Graphics, vol. 35, No. 6, XP058306349, pp. 1-14, Nov. 2016.
Lombardi, et al., Deep Appearance Models for Face Rendering, vol. 37, No. 4, Article 6, ARXIV:1808.00362V1, XP081411359, pp. 1-14, Aug. 1, 2018.

* cited by examiner

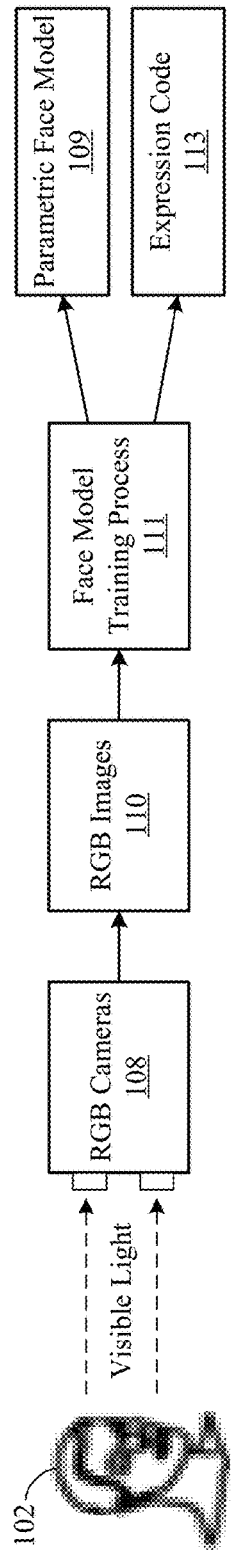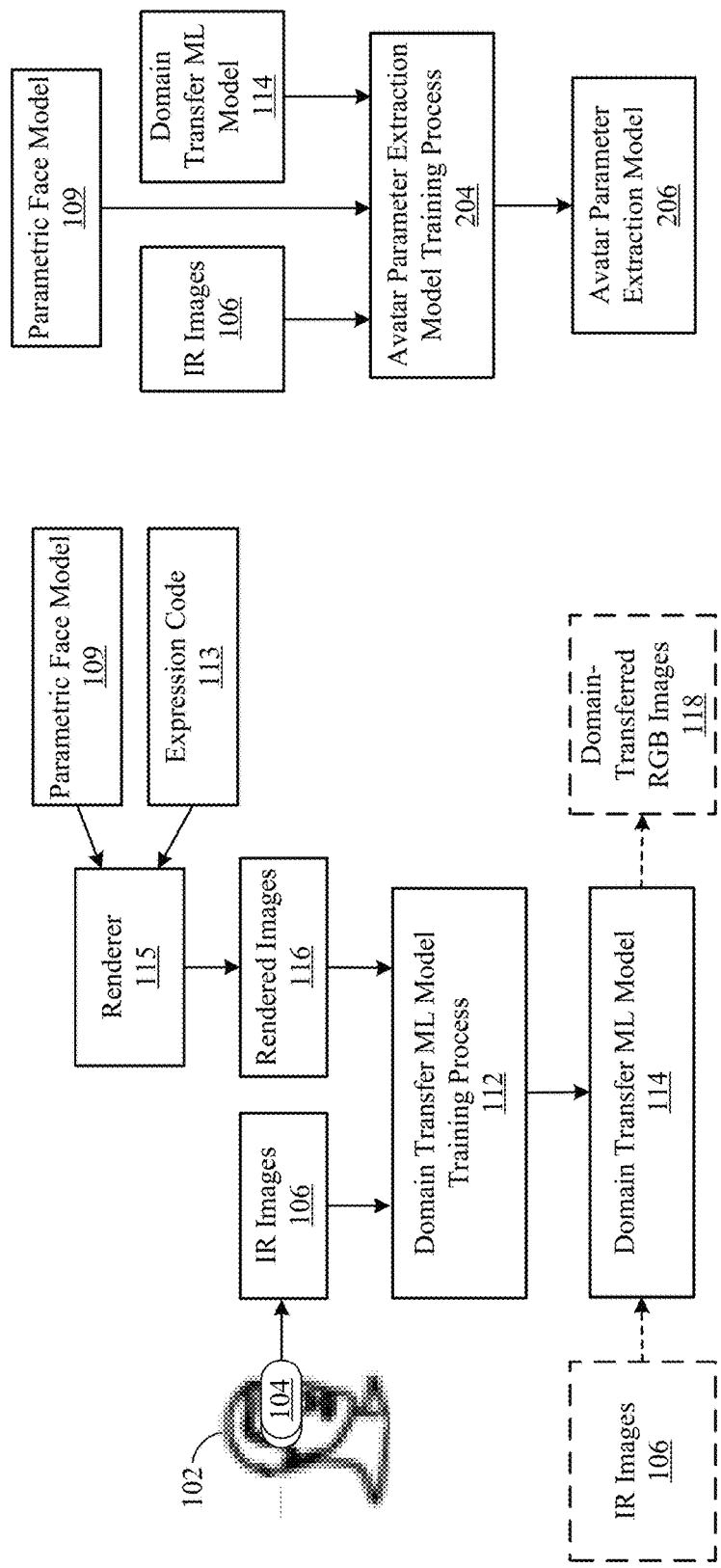
FIG. 1A
FIG. 1B
FIG. 2

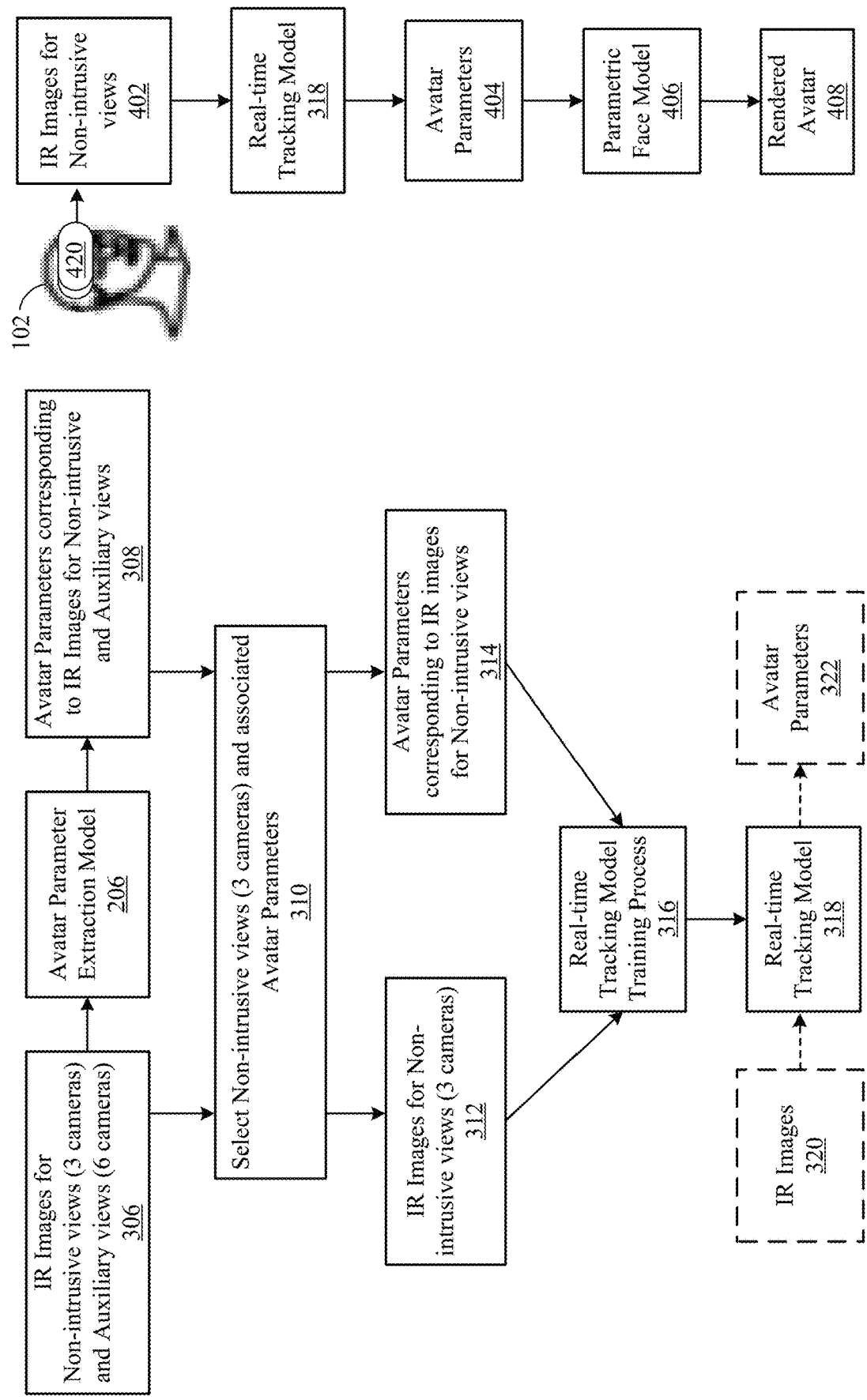

ALGORITHM 1: Uncooperative training for multiview image style translation

Input: Unpaired real HMC images $\{H_i^t\}$ and real rendered images $\{R_i^s\}$, in common two views $i \in \{0, 1\}$.
Output: Converged $F_\phi$ and $G_\psi$
Initialize parameters in all modules;
repeat
    Sample $(t, s)$ to get $H_i^t, R_i^s$ for $i \in \{0, 1\}$ (total 4 images);
    Update $\phi$ for F using gradients minimizing $L_{CH} + L_{GH} + L_{VH}$;
    Update $\psi$ for G using gradients minimizing $L_{CR} + L_{GR} + L_{VR}$;
    Update P using gradients minimizing $L_P$;
    Update $D_H$ and $D_R$ using gradients maximizing $L_G$
until *converged*;

*FIG. 10*

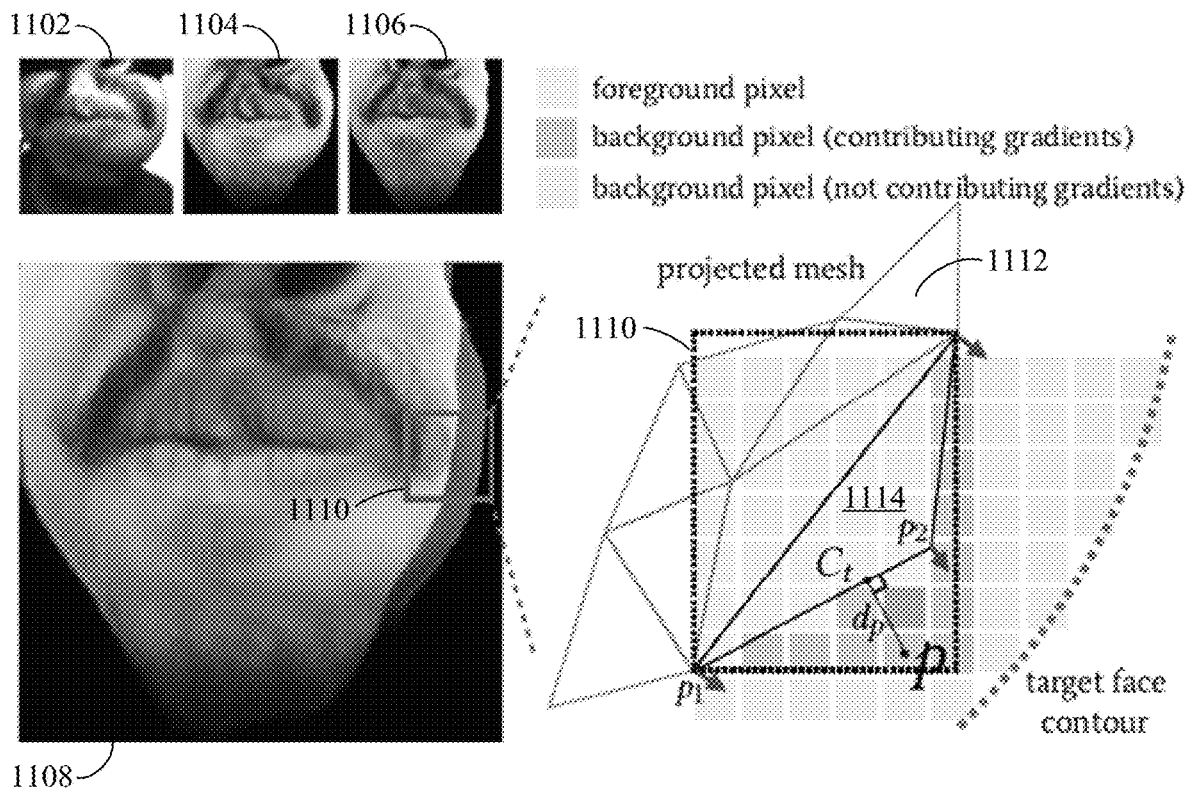

ANIMATING AVATARS FROM HEADSET CAMERAS

TECHNICAL FIELD

This disclosure generally relates to mapping captured face images from cameras mounted on AR/VR headsets to graphical representations of users.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

In particular embodiments, a system may automatically map images captured by a head-mounted capture device to status (e.g., facial expressions) of a user's avatar. The headset has IR cameras that provide partial images of the face. An avatar that mimics the facial expressions of the user's face may be animated based on the images from the IR cameras mounted in the headset. The avatar may be displayed by headsets of the user and other users during a telepresence session, for example. The avatar may be animated by determining a set of parameters that represent the 3D shape of a face and providing the parameters to an avatar generator that generates the 3D shape.

Animating an avatar based on input provided by IR cameras is difficult because the IR cameras provide a patchwork of close-up, oblique views of the face from different viewpoints, instead of a complete view of the face. The problem is to construct an avatar that mimics the facial expressions based on the partial "images" provided by the IR cameras. In particular embodiments, a training headset having additional, more intrusive, IR cameras may be used to capture additional views of the face for training a machine-learning model, and a headset having fewer, less-intrusive cameras may be used with the trained model. However, the training headset still generates a patchwork of close-up, oblique views of the face. Visible-light cameras may be used in the training process to supplement the IR cameras, but the visible-light cameras do not provide views of portions of the face occluded by the headset. Further, there is a modality gap between the IR cameras, which do not sense the visible spectrum, and the avatars, which are generated in the visible spectrum. Moreover, there is no clear correspondence between the captured IR images and the user's actual facial expression (since it would be occluded by the AR/VR headset) nor the desired parameters for the avatar generator that would render an avatar matching the user's actual facial expression. The modality gap also exists between captured images in the IR and visible-light spectrums. There is no clear correspondence between captured IR images and the captured visible-light images because the IR images depict different portions of the face than the visible-light images.

This disclosure teaches a method for determining the correspondence between captured IR images and avatar parameters that control the avatar's facial expressions and head poses. The correspondence may be determined by training a domain transfer machine learning model to transfer the IR images to rendered avatar images, then, using the domain-transfer machine-learning model, training a parameter-extraction machine-learning model to identify the avatar parameters based on the IR images. The parameter-extraction model may then be used to train a real-time tracking model based on the correspondence between the portions of the IR images generated by non-intrusive cameras (e.g., 3 cameras) and the corresponding avatar parameters identified by the parameter-extraction model. The real-time tracking model may be used by a headset having non-intrusive cameras to identify the avatar parameters based on IR images generated by the non-intrusive cameras.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in particular embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In particular embodiments, a system may comprise one or more non-transitory computer-readable storage media embodying instructions, one or more processors coupled to the storage media and operable to execute the instructions to access a plurality of first captured images of a user that are captured in a first spectral domain, generate, using a first machine-learning model, a plurality of first domain-transferred images based on the first captured images, wherein the first domain-transferred images are in a second spectral domain, render, based on a first avatar, a plurality of first rendered images comprising views of the first avatar, the first avatar being a virtual representation of the user, and update the first machine-learning model based on comparisons between the first domain-transferred images and the first rendered images, wherein the updated first machine-learning model is configured to translate images in the first spectral domain to the second spectral domain.

In particular embodiments, the processors may be further operable to execute the instructions to generate, using a second machine-learning model, the first avatar based on the first captured images. The first avatar may be rendered using a parametric face model based on a plurality of avatar parameters. A distribution of the avatar parameters in the first domain-transferred images may correspond to a distribution of the avatar parameters in the first rendered images. The first machine-learning model may be updated using a loss function based on a difference between each first domain-transferred image and each corresponding first rendered image. The loss function may be further based on one or more spatial relationships between cameras that capture the images.

In particular embodiments, the processors may be further operable to execute the instructions to access a plurality of second captured images that are captured in the first spectral domain, generate, using the updated first machine-learning model, a plurality of second domain-transferred images based on the second captured images, wherein the second domain-transferred images are in the second spectral domain, generate, using a second machine-learning model, a second avatar based on the second captured images, render, based on the second avatar, a plurality of second rendered images comprising views of the second avatar, and update the second machine-learning model based on comparisons between the second domain-transferred images and the second rendered images, wherein the second machine-learning model is configured to generate, based on one or more first input images, one or more avatar parameters for rendering avatars that correspond to the first input images. The updated second machine-learning model may be further configured to generate, based on the one or more first input images, pose information that represents spatial orientation of the avatars. The first and second captured images may be captured by cameras associated with a training headset.

In particular embodiments, the processors may be further operable to execute the instructions to access a plurality of third captured images, wherein the third captured images are from a subset of the second captured images, generate, using the updated second machine-learning model, avatar parameters that correspond to the third captured images, and train, based on the correspondence between the third captured images and the corresponding avatar parameters, a third machine-learning model to generate, based on one or more second input images, one or more avatar parameters that correspond to the second input images. The third machine-learning model may generate the output avatar parameters in real-time. The third captured images may be captured by a plurality of training cameras associated with a training headset, and the second input images are captured by a plurality of non-intrusive cameras associated with a non-intrusive headset. Positions of the non-intrusive cameras on the non-intrusive headset may correspond to positions of a subset of the training cameras on the training headset. The third machine-learning model may comprise a plurality of convolutional neural network branches that generate one-dimensional vectors, wherein each branch corresponds to a camera and converts received images captured by the corresponding camera in the first spectral domain to a corresponding one of the one-dimensional vectors, and a multi-layer perceptron that converts the vectors to avatar parameters.

In particular embodiments, the processors may be further operable to execute the instructions to access a plurality of third images captured in the first spectral domain, wherein the third images are captured by non-intrusive cameras, the second images are captured by intrusive cameras, and the non-intrusive cameras are fewer in number than the intrusive cameras, generate, using the third machine-learning model, avatar parameters based on the third images, render, based on the avatar parameters, a plurality of third rendered images comprising views of a third avatar, and present, to a user, the third rendered images. The system may further comprise first and second Graphics Processing Units (GPUs), and the processors may be further operable to execute the instructions to access a plurality of images of a first user that are captured in the first spectral domain, generate, by executing the third machine-learning model on the first GPU, first avatar parameters based on the images of the first user, and send, via a communication network, the first avatar parameters to a computing device of a second user. The processors may be further operable to execute the instructions to receive, via the communications network, second avatar parameters from the computing device of the second user, render, using the second GPU and based on the second avatar parameters, a plurality of third rendered images comprising views of an avatar of the second user, and present, to the first user, the third rendered images. The first spectral domain may be infrared, and the second spectral domain may be visible light.

In particular embodiments, one or more computer-readable non-transitory storage media may embody software that is operable when executed to access a plurality of first captured images of a user that are captured in a first spectral domain, generate, using a first machine-learning model, a plurality of first domain-transferred images based on the first captured images, wherein the first domain-transferred images are in a second spectral domain, render, based on a first avatar, a plurality of first rendered images comprising views of the first avatar, the first avatar being a virtual representation of the user, and update the first machine-learning model based on comparisons between the first domain-transferred images and the first rendered images, wherein the updated first machine-learning model is configured to translate images in the first spectral domain to the second spectral domain.

In particular embodiments, a method may comprise by a computing device, accessing a plurality of first captured images of a user that are captured in a first spectral domain, by the computing device, generating, using a first machine-learning model, a plurality of first domain-transferred images based on the first captured images, wherein the first domain-transferred images are in a second spectral domain, by the computing device, rendering, based on a first avatar, a plurality of first rendered images comprising views of the first avatar, the first avatar being a virtual representation of the user, and by the computing device, updating the first machine-learning model based on comparisons between the first domain-transferred images and the first rendered images, wherein the updated first machine-learning model is configured to translate images in the first spectral domain to the second spectral domain.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 1A illustrates an example method for creating an avatar based on images captured in the visible-light spectral domain.

FIG. 1B illustrates an example method for training a domain-transfer machine-learning model to transfer images between different spectral domains.

FIG. 2 illustrates an example method for training an avatar parameter-extraction machine-learning model to extract avatar parameters from images in the infrared spectral domain.

FIG. 3 illustrates an example method for training a real-time tracking model to extract avatar parameters from images in the infrared spectral domain.

FIG. 4 illustrates an example method for animating an avatar based on infrared images using a real-time tracking model.

FIG. 10 illustrates an example algorithm for training for multi-view image domain translation.

FIG. 11 illustrates example background-aware differentiable rendering.

DESCRIPTION OF EXAMPLE EMBODIMENTS

Figure 5:
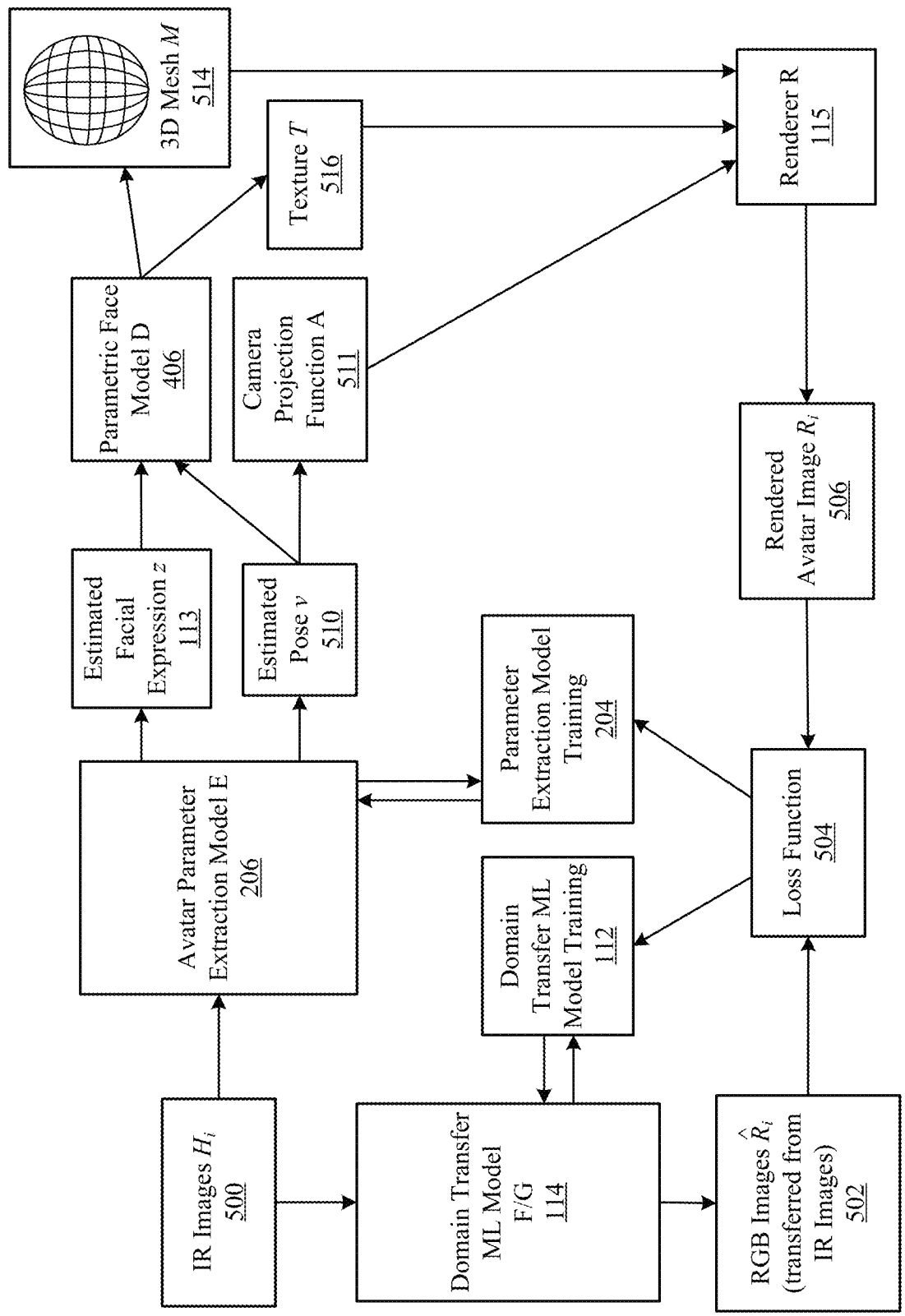
FIG. 5 illustrates an example pipeline for establishing correspondence between infrared images and avatar parameters by training domain-transfer and parameter-extraction machine-learning models.

In particular embodiments, a system may automatically map images captured by a head-mounted capture device to status (e.g., facial expressions) of a user's avatar. The headset has IR cameras that provide partial images of the face. An avatar that mimics the facial expressions of the user's face may be generated based on the images from the IR cameras mounted in the headset. The avatar may be displayed by headsets of the user and other people during a telepresence session, for example. The avatar may be constructed by determining a set of parameters that represent the 3D shape of a face and providing the parameters to an avatar generator that generates the 3D shape.

Constructing an avatar based on input provided by IR cameras is difficult because the IR cameras provide a patchwork of close-up, oblique views of the face from different viewpoints, instead of a complete view of the face. The problem is to construct an avatar that mimics the facial expressions based on the partial "images" provided by the IR cameras. In particular embodiments, a training headset having additional, more intrusive, IR cameras may be used to capture additional views of the face for training a machine-learning model, and a tracking headset having fewer, less-intrusive cameras may be used with the trained model. However, the training headset still generates a patchwork of close-up, oblique views of the face. Visible-light cameras may be used in the training process to supplement the IR cameras, but the visible-light cameras do not provide views of portions of the face occluded by the headset. Further, there is a modality gap between the IR cameras, which do not sense the visible spectrum, and the avatars, which are generated in the visible spectrum. Moreover, there is no clear correspondence between the captured IR images and the user's actual facial expression (since it would be occluded by the AR/VR headset) nor the desired parameters for the avatar generator that would render an avatar matching the user's actual facial expression. The modality gap also exists between captured images in the IR and visible-light spectrums. There is no clear correspondence between captured IR images and the captured visible-light images because the IR images depict different portions of the face than the visible-light images.

This disclosure teaches a method for determining the correspondence between captured IR images and avatar parameters that control the avatar's facial expressions and head poses. The correspondence may be determined by training a domain-transfer machine learning model to transfer the IR images to rendered avatar images, then, using the domain-transfer machine-learning model, training a parameter-extraction machine-learning model to identify the avatar parameters based on the IR images. The parameter-extraction model may then be used to train a real-time tracking model based on the correspondence between the portions of the IR images generated by non-intrusive cameras (e.g., 3 cameras) and the corresponding avatar parameters identified by the parameter-extraction model. The real-time tracking model may be used by a tracking headset having non-intrusive cameras to identify the avatar parameters based on IR images generated by the non-intrusive cameras.

FIG. 1A illustrates an example method for creating an avatar based on images captured in the visible-light spectral domain. One or more visible-light ("RGB") cameras 108 may capture one or more RGB images 110 of a user 102 based on visible light. This use of the RGB cameras 108 to capture of the RGB images 110 is referred to herein as "modeling capture." The RGB cameras 108 may be parts of a multiview camera apparatus, which may include, e.g., 20, 30, 40, or other suitable number of RGB cameras 108. The RGB images 110 may be used by a face model training process 111 to create a parametric face model 109 and facial expression code 113. The expression code 113 may be a representation of the user's facial state, and may encode aspects of the face such as eye gaze direction, mouth pose, tongue expression, and so on. The face model 109 and expression code 113 may be used to animate (e.g., render) an avatar that corresponds to the face of the user 102.

FIG. 1B illustrates an example method for training a domain-transfer machine-learning (ML) model 114 to transfer images between different spectral domains. Spectral domains may include infrared, visible light, or other domains in which images may be captured by cameras. A headset 104 worn by a user 102 may have one or more infrared (IR) cameras, which may capture one or more IR images 106. Each IR image 106 may be referred to herein as a "frame" and may be associated with a time of capture. The headset 104 may be a training headset having a set of cameras of a particular spectral domain. For example, the set of training cameras may include, e.g., 5, 9, 11, 12, or other suitable number of IR cameras, as described below with reference to FIG. 6A. A domain-transfer ML model training process 112 may train the domain-transfer ML model 114 based on the IR images 106 and rendered images 116. The rendered images 116 may be rendered by a renderer 115 based on the parametric face model 109 and facial expression code 113 generated from the RGB images 110. The domain-transfer ML model 114 may be trained on each frame received from the IR cameras of the headset 104. The domain-transfer ML model 144 may, after being trained, perform image domain transfer by generating domain-transferred images 118 in the RGB (visible light) spectrum based on IR images 106 received in the IR spectrum.

In particular embodiments, to build a mapping between the IR and RGB spectral domains, there should be a comparable distribution of image factors, including facial expressions and head poses, between the IR images 106 and the domain-transferred RGB images 118. The RGB images 110 captured by the RGB cameras 108 may be high-resolution images of a user 102's face (without wearing a training headset) as the user makes a series of expressions, e.g., while reading sentences, performs a range of motions during conversation, and so on. For example, the user 102 may follow a script while being imaged by the RGB cameras 108. The user 102 may then follow a similar script while wearing a training headset 104, which may image the user's face using the set of IR cameras on the headset 104, e.g., 9, 11, or other suitable number of cameras. The RGB images 110 may be used to ensure that the distribution of facial expressions in the IR images 106 is comparable to that in the domain-transferred RGB images 118 (and similarly for the distributions of head poses in the two domains).

In particular embodiments, the IR images 106 may be captured at a different time than the RGB images 110. The headset 104 may occlude portions the user's face, and the IR cameras in the headset 104 do not ordinarily capture the occluded portions of the face. In particular embodiments, the RGB cameras 108 can capture portions of the face that are occluded from the IR cameras in the headset 104 because the user 102 does not wear the headset 104 when the RGB images 110 are captured. Although there is a correspondence between the RGB and IR spectral domains, the correspondence is initially unknown. The RGB images 110 and IR images 106 cannot ordinarily be captured simultaneously because of the occlusion of the user's face by the headset 104. Thus, identifying the correspondence between the IR images 106 and the facial expression codes 113 for rendering avatars is a problem solved by the techniques disclosed herein. Since the correspondence is not available for direct use in supervised learning, the problem of learning the domain-transfer ML model 114 may be understood as an unsupervised learning problem. In other words, the problem is to train the domain-transfer ML model 114 to construct a mapping between IR images 106 and RGB images 110 without ground truth information that would provide a frame-by-frame correspondence across the two domains.

In particular embodiments, the ML models, such as the domain-transfer ML model 114, that are used in generating an avatar for a particular user 102 may be trained based on that particular user's facial expressions. When an avatar is configured based on domain-transferred RGB images generated from headset IR images using the domain-transfer ML model 114, from the perspective that is the same from the headset cameras, the images of the avatar should be consistent with the spatial structures captured by the RGB images 110 that correspond to the IR images 106. The texture may be different, but the locations of facial features on the avatar, such as the locations of the eyes, nostrils, mouth, and so on, should be generally the same in the RGB images as in the IR images 106. If the RGB camera position changes, the RGB images 110 should change accordingly and look the same as the IR images 106 in terms of spatial structure. The training process 112 is described in further detail below with reference to FIG. 5. In particular embodiments, once sufficient data has been collected, and correspondences have been established for a sufficient number of people, it may be possible to not require the training process 112 to be performed for each user. An avatar generator and tracking system may then be directly generated based on a user's social-network profile picture, for example, without training separate ML models for each user.

FIG. 2 illustrates an example method for training an avatar parameter-extraction machine-learning (ML) model 206 to extract avatar parameters from images 106 in the infrared spectral domain. An avatar parameter extraction model training process 204 may train the avatar parameter extraction model 206 using the IR images 106, the parametric face model 109, and the domain transfer ML model 114. The domain transfer ML model 114 may be used to generate domain-transferred RGB images 118 based on IR images 106, and the avatar parameter extraction model training process 204 may learn avatar parameters that cause the parametric face model 109 to render an avatar having an appearance similar to the domain-transferred RGB images 118. The avatar parameters may include a facial expression code 113 and a head pose (not shown). The similarity between the avatar and the RGB images 118 may be measured using a loss function, which may compare images (e.g., at the pixel level) of the avatar rendered based on learned avatar parameters to the domain-transferred RGB images 118. The avatar parameter extraction model training process is described in further detail below with reference to FIG. 5

FIG. 3 illustrates an example method for training a real-time tracking machine-learning (ML) model 318 to generate avatar parameters based on input images 312 from non-intrusive cameras. The real-time tracking ML model 318 may be trained, based on a correspondence between IR images 306 and avatar parameters 308, to directly map input IR images 320 to avatar parameters 322 for animating an avatar. The avatar parameters 308 may include a facial expression code and a head pose. The correspondence (between IR images 306 and avatar parameters 308) used for the training may be identified by the avatar parameter extraction ML model 206. The input IR images used to train (and subsequently drive) the real-time tracking ML model 318 may be from a set of non-intrusive IR cameras, which may be a subset of the training cameras used to generate the avatar parameter extraction model 206. For example, the non-intrusive cameras may include 3 cameras at non-intrusive locations on a non-intrusive headset 420, and the training cameras may include 9 cameras on a training headset 104. The 9 cameras may include 3 cameras at non-intrusive locations similar to the non-intrusive camera locations on the non-intrusive headset 420, and 6 additional cameras, which may be at locations that are more intrusive to the user wearing the training headset 104. An example non-intrusive headset 420 is described below with reference to FIG. 6C.

In particular embodiments, the avatar parameter extraction model 206 may be used to find correspondences between a set of 9 IR images 306 captured by the 9 training cameras and a set of corresponding avatar parameters 308 for use in training a real-time tracking ML model 318. The real-time tracking ML model 318 may be used with a non-intrusive headset 420. The non-intrusive headset 420 may have fewer cameras than the training headset 104, though the positions of the cameras of the non-intrusive headset 420 may correspond to those of respective cameras on the training headset 104. For example, the training headset 104 may have 9 cameras, including 3 that are in non-intrusive positions. The non-intrusive headset 420 may have 3 cameras in similar non-intrusive positions to the 3 non-intrusive cameras on the training headset 104.

As an example, since the 9 IR images 306 are known to correspond to the set of avatar parameters 308 (according to the avatar parameter extraction model 206), the set of avatar parameters 308 may be used as the ground truth in a supervised-learning process such as a real-time tracking model training process 316. The real-time tracking ML model 318 may be trained based on sets of 3 IR images 312 from the three non-intrusive cameras of the training headset 104 and a corresponding set of avatar parameters 314 (selected from the avatar parameters 308) that correspond to the IR images 312. Block 310 may select each set of 3 non-intrusive IR images 312 and the corresponding non-intrusive avatar parameters 314 from the training IR images 306 and the training avatar parameters 308, respectively. Once trained, the real-time tracking ML model 318 may directly output avatar parameters 322 based on sets of 3 IR images 320 received from the non-intrusive cameras of a non-intrusive headset. The avatar parameters may be used to animate an avatar, as described below. Although the ML models and their training are described in terms of particular numbers of images in particular spectral domains, the ML models may be trained and used on any suitable number of images in any suitable spectral domains.

FIG. 4 illustrates an example method for animating an avatar based on infrared images 402 using a real-time tracking model 318. IR images 402 may be captured from a non-intrusive headset 420. For example, there may be 3 IR images 402 in each frame from the non-intrusive headset 420 (instead of, e.g., 9 IR images 106 from the training headset 104). The real-time tracking model 312 may generate avatar parameters 404, which may be used in combination with a parametric face model 406 to render a rendered avatar 408. The avatar parameters 404 may include facial expression and headset pose parameters, as described below.

FIG. 5 illustrates an example pipeline for establishing correspondence between infrared images and avatar parameters by training domain-transfer and parameter-extraction machine-learning models. In particular embodiments, the pipeline may use a pre-trained personalized parametric face model D 406, which may be understood as an avatar that can be configured based on avatar parameters such as an estimated facial expression 113 and an estimated pose 510. The parametric face model D 406 may be a deep appearance model, e.g., a deep deconvolutional neural network, which generates a representation of the avatar, including geometry and a texture, based on the avatar parameters. The estimated facial expression 113 may be an l-dimensional latent facial expression code $z \in \mathbb{R}^l$ 113. The estimated pose 510 may be a 6-DOF rigid pose transform $v \in \mathbb{R}^6$ 510 from the avatar's reference frame to the headset (represented by a reference camera). The estimated pose 510 may be a view vector, represented as the vector pointing from the head of the user to the camera (e.g., relative to a head orientation that may be estimated from a tracking algorithm). The geometry, which may be a mesh M 514, and a texture T 516 may be generated based on the facial expression code z 113 and pose v 510 using the parametric face model D 406 as follows:

$$M, T \leftarrow D(z, v) \quad (1)$$

In particular embodiments, the mesh $M \in \mathbb{R}^{n \times 3}$ 514 represents the facial shape comprising n-vertices, and the texture $T \in \mathbb{R}^{w \times h}$ 516 is the generated texture. A rendered image R 506 can be generated from this shape and texture through rasterization by a renderer R 115 based on the mesh M 514, the texture T 516, and the camera's projection function A 511:

$$R \leftarrow R(M, T, A(v)) \quad (2)$$

That is, the pose 510 may be transformed by the camera's projection function A 511 prior to being sent to the renderer R 115.

Given multiview images $\mathcal{H} = \{H_i^t\}_{i \in C}$ 500 acquired from a set of headset cameras C, particular embodiments may estimate the user's facial expression as seen in the views in the images 500. The images 500 may be from, e.g., 9 or 11 camera views of cameras on an intrusive headset 104. A solution may be identified by estimating the latent facial expression code z 113 and headset pose v 510 that best align the rendered avatar image 506 to the acquired images 500 for comparison by a loss function 504. In particular embodiments, instead of performing this task separately for each frame in a recording, these attributes may be simultaneously estimated over the dataset comprising, e.g., thousands of multiview frames. Model parameters θ may be estimated for an avatar parameter extraction model $E_\theta$ 206 (e.g., a predictor network) that extracts $\{z^t, v^t\}$, the facial expression code 113 and headset pose 510 for each frame $t \in \mathcal{T}$ of the images 500 by jointly considering data from a plurality of (e.g., a majority of or all) cameras for that frame (which may correspond to a time instant):

$$z^t, v^t \leftarrow E_\theta(\mathcal{H}^t) \quad (3)$$

Note that the same avatar parameter extraction model E 206 may be used for all frames in the dataset (e.g., for each frame $t \in \mathcal{T}$). Analogous to non-rigid structure from motion, using E 206 in this way has the benefit that regularity in facial expression across time can further constrain the optimization process, making the results more resistant to terminating in poor local minima.

In particular embodiments, because of the domain gap between the rendered avatar images R 506 and the camera acquired images H 500, they are not directly comparable. To address this incompatibility, model parameters $\phi$ of a domain-transfer model F 114 (e.g., a view-dependent neural network) may also be learned:

$$\hat{R}_i = F_\phi(H_i; i) \qquad (4)$$

This function F 114 may be evaluated for each camera (e.g., for each $i \in C$), and may comprise independent networks for each camera i. An analysis-by-synthesis reconstruction loss may then be formulated as:

$$L(\theta, \phi) = \sum_{t \in T} \left( \sum_{i \in C} \|\hat{R}_i^t - R_i^t\|_1 + \lambda \delta(z^t) \right), \qquad (5)$$

where $R_i^t$ 506 is the rendered face model from Equation (2), rasterized using the known projection function $A_i$ 511, whose parameters may be obtained from the calibrated camera i. Here, $\delta$ is a regularization term over the latent facial expression z 113, and $\lambda$ weights its contribution against the $L_1$-norm reconstruction of the domain-transferred image $\hat{R}_i^t$ 502 (the double bars representing a norm of the difference between the domain-transferred images and the rendered face model).

In particular embodiments, there may be a space of solutions where one network (e.g., F 114) can compensate for the semantic error incurred by the other (e.g., E 206), leading to low reconstruction errors but incorrect estimation of facial expression z 113 and headset pose v 510. Without additional constraints, this phenomenon may often occur in practice. This behavior is referred to as collaborative self-supervision. When the domain gap primarily comprises appearance differences, collaborative self-supervision can be more prominent in architectures that do not retain spatial structure. This is the case in particular embodiments disclosed herein, where the latent facial expression code z 113 may be a vectorized encoding of the image.

Thus, in particular embodiments, Equation (5) may be decoupled into two stages. First, the domain-transfer model F 114 may be learned separately from E 206. After that, F 114 may convert headset images $H_i$ 500 into domain-transferred images $\hat{R}_i^t$ 502 without changing the apparent facial expression (e.g., semantics). The first training stage, represented by the Domain Transfer ML Model Training block 112, produces the domain transfer model F 114. In the second training stage, represented by a Parameter Extraction Model Training block 204, F 114 may be held fixed, and Equation (5) may be optimized with respect to E 206 to produce the avatar parameter extraction model E 206, by matching rendered images $R_i^t$ 506 to domain-transferred images $\hat{R}_i^t$ 502.

Figure 9:
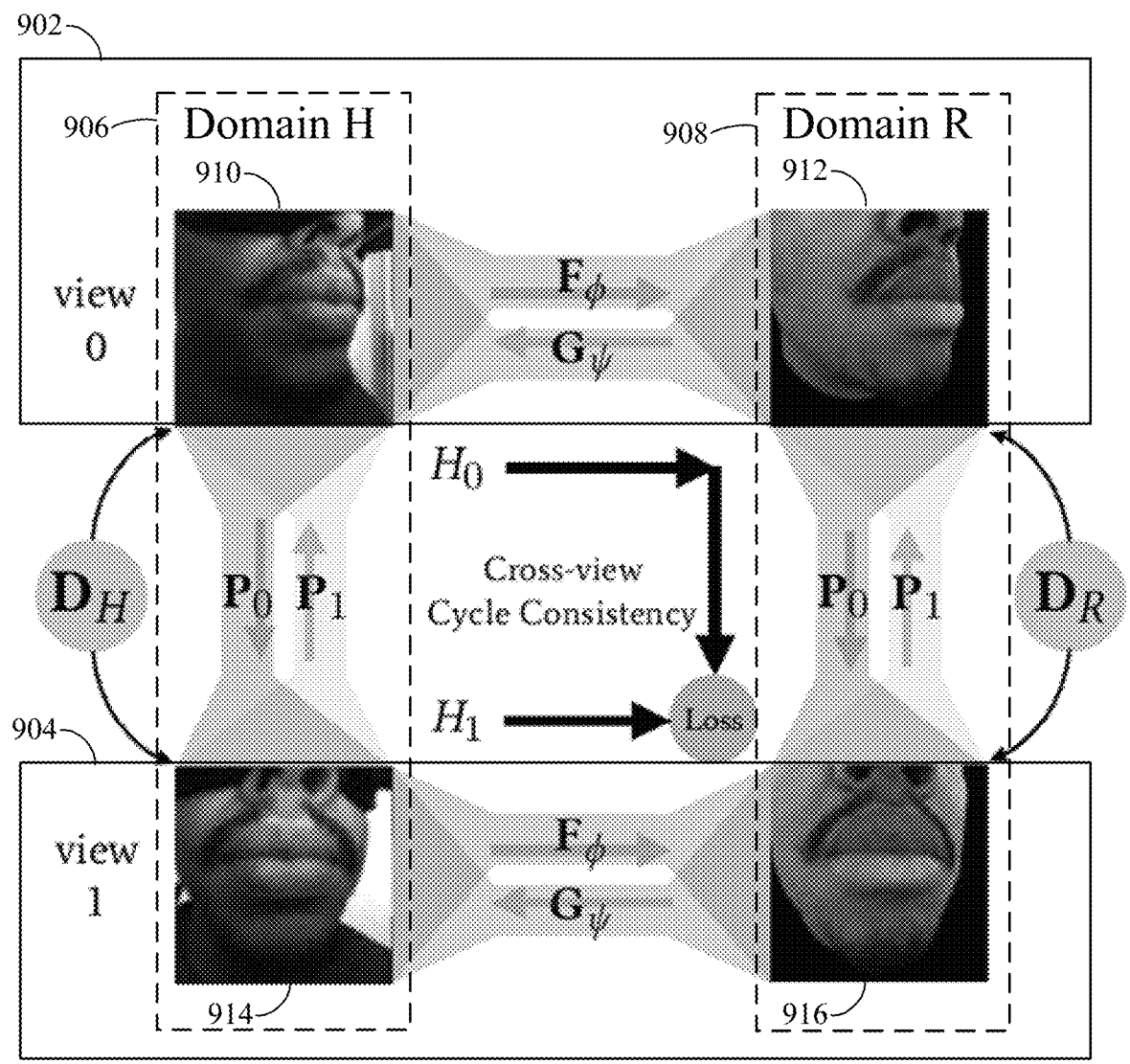
FIG. 9 illustrates example cross-view cycle consistency in multi-view image domain translation between different spectral domains.

In particular embodiments, the facial-expression-preserving domain transfer may be based on unpaired image translation networks. This architecture may learn a bidirectional domain mapping ($F_\phi$ and $G_\psi$, 114) by enforcing cyclic consistency between the domains and an adversarial loss for each of the two domains. Thus, in addition to the headset-to-render domain transfer network F, a render-to-headset transfer network G may also be trained, as shown in FIG. 9. To achieve preservation of expression, the tendency of generators to modify the spatial structure of the images should be reduced or eliminated. With a fully-convolutional architecture in which random initialization already leads to retained image structures, this tendency may primarily come from the pressure to prevent opposing discriminators from spotting fake images from their spatial structure. In other words, if the distribution of spatial structure, which in particular embodiments is jointly determined by headset poses v 510 and facial expressions z 113, is balanced, the generators may then have no pressure to begin modifying them.

In particular embodiments, the balanced distribution of spatial structure may be generated when preparing datasets prior to training. More specifically, to train the image domain transfer networks $F_\phi$ and $G_\psi$ 114, the dataset counterpart of $\{\mathcal{H}^t\}$ 500 may be prepared using the parametric face model D 406 to render a set of images before applying a Cycle Generative Adversarial Network (CycleGAN) or other suitable image-to-image translation. The distribution of the image factors that are to be kept unchanged should be comparable across the domains. These factors may be the headset poses v 510 and facial expressions z 113, whose renderings may be controlled by $v^t$ and $z^t$, respectively. While the underlying facial expressions z and headset poses v in captured headset data are not ordinarily controllable, a set of rendered images $\{R_i^s\}_{s \in S}$ having the desired statistics may be generated based on an estimate $\hat{P}(z, v)$ of the joint distribution $P(z, v)$. However, since estimating z and v for headset data is the original problem, a proxy may be used to approximate $\hat{P} \approx P$.

Figure 8:
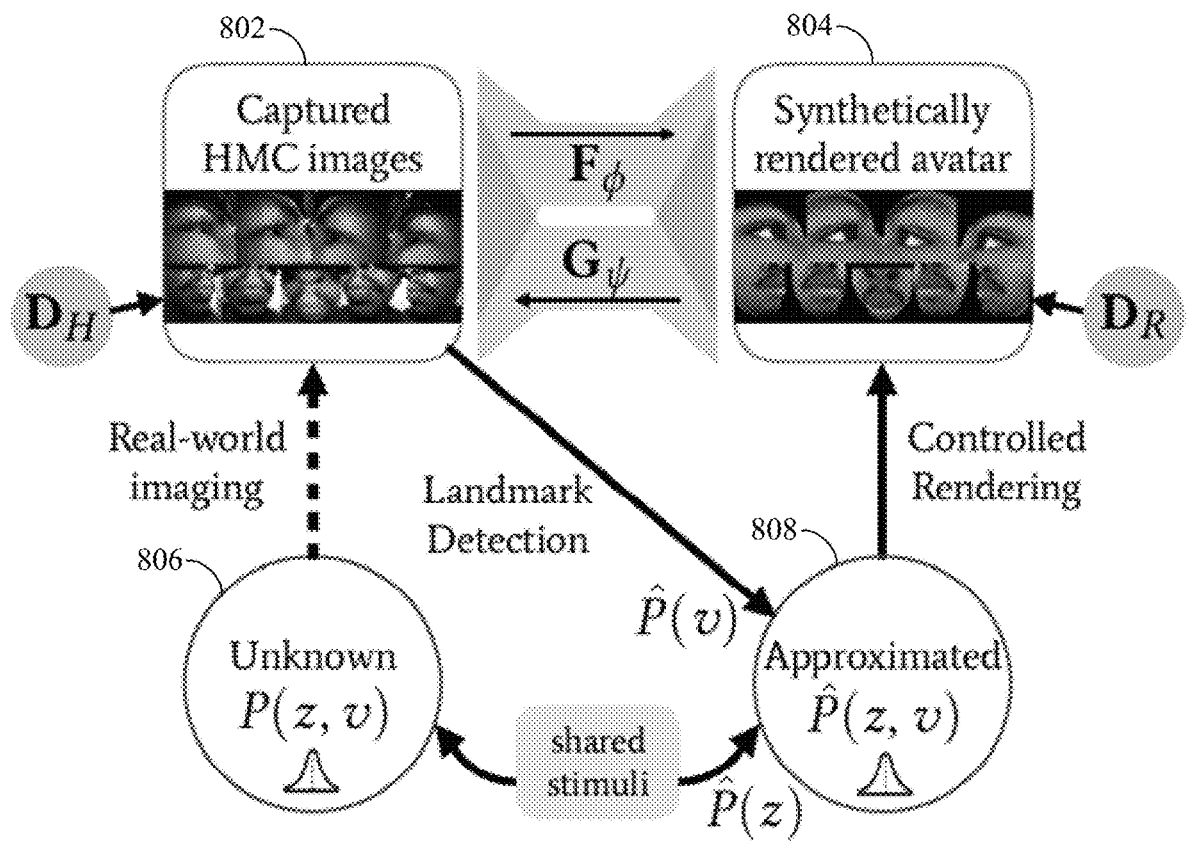
FIG. 8 illustrates example matching of the distribution of spatial structures of images in different spectral domains.

In particular embodiments, matching distribution of spatial structures is shown in the example of FIG. 8. Independent distribution between z and v, or $\hat{P}(z, v) = \hat{P}(z)\hat{P}(v)$, is assumed, and $\hat{P}(z)$ and $\hat{P}(v)$ are estimated individually. For the distribution over facial expressions $\hat{P}(z)$, particular embodiments may rely on the data capture process, where a user may be captured twice with the same stimuli (e.g., using RGB cameras 108 for a "modeling" capture and IR cameras of headset 104 for another capture). Even though using two captures may not lead to a frame-to-frame mapping between the captures, the statistical distribution of facial expression may be assumed to be comparable. Therefore, the set of facial expression codes z 113 from the RGB cameras 108 of the modeling capture may be used as approximate samples from P(z).

Figure 7:
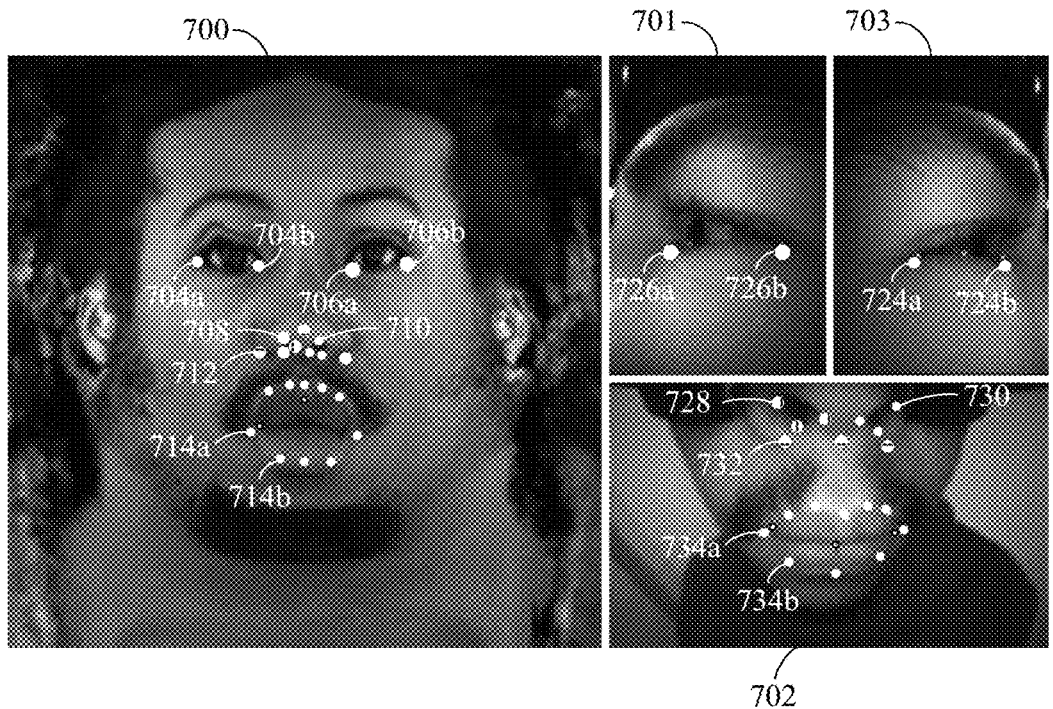
FIG. 7 illustrates example landmarks on a texture map of an avatar and head-mounted camera images.

In particular embodiments, for the distribution over headset pose $\hat{P}(v)$, the 3D geometry of the face model D 406 may be fitted to detected landmarks on headset images 500 by collecting 2D landmark annotations and training landmark detectors. Example landmarks are shown in FIG. 7. Although landmark fitting alone does not necessarily produce accurate estimates of facial expression, landmark fitting can give reasonable estimates for the headset pose v because of its low dimensionality and limited range of variation. One of the challenges in fitting a 3D mesh to 2D detections is defining correspondence between mesh vertices and detected landmarks. The landmark set for which annotations are available does not necessarily match exactly to any vertex in a particular mesh topology. Manually assigning a single vertex to each landmark can lead to suboptimal fitting results for coarse mesh topologies. To address this problem, while fitting individual meshes, particular embodiments may simultaneously solve for each landmark's mesh correspondence (e.g., used across all frames) in the texture's uv-space $\{u_j \in \mathbb{R}^{1 \times 3}\}_{i=1}^m$, where m is the number of available landmarks. To project each landmark m on rendered images of every view, particular embodiments may calculate a row vector of the barycentric-coordinates $b_j \in \mathbb{R}^{1\times 3}$ of the current $u_j$ in its enclosing triangle, with vertices indexed by $a_j \in \mathbb{N}^3$, and then linearly interpolate projections of the enclosing triangle's 3D vertices, $M_{a_j} \in \mathbb{R}^{3\times 3}$, where M is the mesh 514 (representing the facial shape) from Equation (1). Accordingly, the following optimization problem may be solved:

$$\min_{u_j, v^t, z^t} \sum_{t \in \mathcal{T}} \sum_{i \in C} \sum_{j=1}^{m} w_{ij}^t \| p_{ij}(H_i^t) - b_j P(M_{a_j}^t, A_i v^t) \|^2, \quad (6)$$

where $p_{ij} \in \mathbb{R}^2$ is the 2D detection of landmark j in HMC camera i, P is a camera projection generating 2D points in $\mathbb{R}^{3\times 2}$, and $w_{ij}^t$ is the landmark's detection confidence in [0, 1]. Note that for a landmark j not observable by view i, $w_{ij}^t$ is zero. The $u_j$'s may be initialized to a predefined set of vertices in the template mesh to prevent divergence. Particular embodiments may also avoid using landmarks in regions where the avatar does not have mesh vertices, which may be, e.g., the pupils and the mouth interior. FIG. 7 shows an example of the $u_j$'s at convergence.

Solving Equation (6) provides a set of headset pose $\{v^t\}_{t \in \mathcal{T}}$ from each frame $\mathcal{H}^t$. Particular embodiments may render the dataset $\{R_i^s\}_{s \in \mathcal{S}}$ by randomly sampling a headset pose $|\mathcal{S}|$ times from $\{v^t\}_{t \in \mathcal{T}}$, and a facial expression code, also $|\mathcal{S}|$ times, from the set of encoded values of the face modeling capture, independently. The randomly-sampled poses and expression codes, together with $\{H_i^t\}$, may form training data for unpaired domain transfer. In particular embodiments, the estimated $z^t$ solved by Equation (6) may be discarded since the estimates of $z^t$ may be poor when relying solely on landmarks.

In particular embodiments, given images from the two domains $\{H_i^t\}$ and $\{R_i^s\}$, a suitable method for unpaired image translation using cycle-consistent adversarial networks may be used to learn the view-specific mappings $F_{\phi,i}$ and $G_{\psi,i}$ 114 that translate images back and forth between the domains. Since a balanced distribution P(z, v) between the domains has been encouraged (as described above), this approach produces reasonable results. However, failure cases may occur as a result of limited rendering fidelity of the parametric face avatar model 406. These cases may be most noticeable in the eye images, where eyelashes and glints may be almost completely absent because of poor generalization of the view-conditioned rendering method to near-field rendering. More specifically, the domain-transferred image 502 may exhibit modified gaze direction compared to the source image 500. In addition, this modification may be inconsistent across different camera views. This last effect may also be observed for the rest of the face, though not to the same extent as that for the eyes. When jointly solving for (z, v) across camera views in Equation (5), these inconsistent and independent errors may have an averaging effect, which may manifest as dampened facial expressions.

In particular embodiments, to overcome this problem, the spatial relationship between cameras during image domain translation may be exploited. A cyclic-consistency may be enforced through cross-view prediction. Specifically, for a pair of views, denoted 0 and 1, "spatial-predictors" $P_0$ and $P_1$ may be trained to transform images in view 0 to view 1 and vice versa. These pairs may be chosen in such a way that they observe similar parts of the face so that their contents are mutually predictable (e.g., the stereo eye-camera pair and the lower face cameras on the same side). Together with the terms of CycleGAN, the loss function may be of the form:

$$L = L_C + \lambda_G L_G + \lambda_P L_P + \lambda_V L_V \quad (7)$$

where $L_C = L_{CH} + L_{CR}$ is the cycle-consistency loss for each domain and for each view, $$L_{CH} = \sum_{i \in \{0,1\}} \sum_t \| G_\psi \circ F_\phi(H_i^t) - H_i^t \|_1, \quad (8)$$

$L_G = L_{GH} L_{GR}$ is the GAN-loss (for both the generator and discriminator) for each domain and for each view, $$L_{GH} = \sum_{i \in \{0,1\}} \sum_t [\log(D_H(H_i^t)) + \log(1 - D_R \circ F_\phi(H_i^t))], \quad (9)$$

$L_P$ is the loss for the view predictor, $$L_P = \sum_{i \in \{0,1\}} \left( \sum_t \| P_i(H_i^t) - H_{1-i}^t \|_1 + \sum_s \| P_i(R_i^s) - R_{1-i}^s \|_1 \right), \quad (10)$$

and the cross-view cycle consistency $L_V = L_{VH} L_{VR}$, $$L_{VH} = \sum_{i \in \{0,1\}} \sum_t \| P_i \circ F_\phi(H_i^t) - F_\phi(H_{1-i}^t) \|_1, \quad (11)$$

where $L_{CR}$, $L_{GR}$, and $L_{VR}$ may be defined symmetrically, and $D_H$ and $D_R$ are discriminators in both domains, respectively. Note that while $H_i^t$ and $R_i^s$ are not paired, $H_i^t$ and $H_{1-i}^t$ are paired, as are $R_i^s$ and $R_{1-i}^s$. An illustration of these components is shown in FIG. 9. $P_0$ and $P_1$ are shared across domains, since the relative structural difference between the views should be the same in both domains.

In particular embodiments, the problem takes the form of a minimax optimization problem:

$$\min_{P_0, P_1, F_\phi, G_\psi} \max_{D_H, D_R} L(P_0, P_1, F_\phi, G_\psi, D_H, D_R). \quad (12)$$

If parameters in $\{P_0, P_1, F_\phi, G_\psi\}$ are trained alternately with parameters in $\{D_H, D_R\}$, collusion between P and $F_\psi$ (or $G_\psi$) may minimize the loss function without preserving expression across the domains, thereby effectively learning different behaviors on real and face data to compensate errors made by each other. As a result, the semantics that should be kept unchanged may be lost during the domain transformation. To address this problem, "uncooperative training" techniques may be used to prevent this "cheating" behavior by breaking the optimization into more steps. At each step, the loss function may be readjusted so that only terms that operate on real data remain, and only modules that take the real-data as input are updated. An outline of the algorithm is shown as Algorithm 1 in FIG. 10. In this way, modules may have no chance to learn to compensate for errors made by previous modules. As a result, facial expressions may be better preserved through domain transfer, and the cross-view predictions may provide multiview consistency.

In particular embodiments, a differentiable renderer R 115 may be used for the parametric face model 406. The differentiable renderer R 115 may be used to generate synthetic samples for the domain transfer described above, and also for evaluating the reconstruction accuracy given the estimated expression and pose parameters q=(z, v) in Equation (5). The rendering function may blend a rasterization of the face model's shape and background, so for a pixel, color C(p) at image position p may be determined by:

$$C(p)=W(p)C_t(p)+(1-W(p))C_b \quad (13)$$

where $C_t(p)$ is the rasterized color from texture at position p, and $C_b$ is a constant background. If W is defined as a binary mask of the rasterization's pixel coverage, where W(p)=1 if p is assigned with a triangle, otherwise W(p)=0, then $\frac{dC(p)}{dq}$ would be zero for all p because of the discreteness of rasterization. In this case, for a foreground pixel (e.g., W(p)=1) the gradient of C(p) may still be calculated from $\frac{dC(p)}{dq}$ by parameterizing the coordinates in the texture (from which the pixel color is sampled) by the barycentric coordinates of that pixel in its currently-enclosing triangle. Although this way of formulating the rendering function and its derivative may produce good results in practice in the presence of multiview constraints, it may exhibit failure cases that may result from zero gradients from W(p). More specifically, if a pixel p is rendered as background (e.g., W(p)=0) but the target for that pixel is a foreground value, there may be no gradients propagated to the expression and pose parameters q=(z, v). Similarly, a foreground pixel at the boundary of the rasterization has no pressure to expand. In practice, these conditions may lead to terminating in poor local minima with substantial reconstruction errors. For example, as shown in FIG. 11, in a puffed-cheek expression, where the target image's foreground image tends to occupy a larger area of the image, the estimated expression may fail to match the contour of the cheek well.

In particular embodiments, the force expanding the foreground area should come from a soft blending around the boundary between foreground and background. Therefore, instead of a binary assignment of pixels around the boundary to either a color sampled from the texture map or the background color, a soft blending similar to anti-aliasing may be used. To obtain better gradient flow, the blending weight may be parameterized by the face model's projected geometry so that reconstruction errors along the rasterization's boundary can be back-propagated to the expression and pose parameters q=(z, v). For this, a decaying blend-function may be used away from the boundary:

$$W(p) = \exp\left\{-\frac{d_p^2}{\sigma^2}\right\}, \quad (14)$$

where $d_p$ is the perpendicular 2D distance from p to the closest edge of any projected triangle for pixels outside the rasterization coverage, and σ controls the rate of decay. The value of $C_t$ used in Equation (13) for W(p) may be set to the color in the texture of the triangle at the closest edge. For pixels within the coverage, $d_p$=0. In practice, a may be set to 1, and W may be evaluated only for pixels within enclosing rectangles of each projected triangle for efficiency. With this background-aware rendering, although a small portion of background pixels may contribute gradients to expand or contract the boundary at each iteration, the number is sufficient to prevent optimization from terminating in poor local minima.

In particular embodiments, for domain transformation, (256×256)-sized images may be used for both domains. For $F_φ$, and $G_ω$, and $P_i$, a ResNet may be used with 4× down-sampling followed by 3 ResNet modules and another 4× up-sampling. For discriminators $D_H$ and $D_R$, spectral normalization may be applied for better quality of generated images and more stable training. For training $E_Θ$, separate convolutional networks may be built to convert individual $H_i^t$ to |C| vectors, before these vectors are concatenated and then separately converted into both $z^t$ and $v^t$ using multilayer perceptrons (MLPs). For the prior $δ(z^t)$ in Equation (5), $L_2$-penalty $δ(z^t)=\|z^t\|_2^2$ may be used, since the latent space associated with D may be learned with a Kullback-Leibler (KL) divergence against a normal distribution.

In particular embodiments, after the training shown in FIG. 5, a converged avatar parameter extraction model $E_Θ$ 206 may be applied to frames $\mathcal{H}^t$ to obtain per-frame correspondences $\{(\mathcal{H}^{t\,t}, z^t)\}_{t\in\mathcal{T}}$. The auxiliary (e.g., intrusive) views in $\mathcal{H}^{t\,t}$ may be dropped, while retaining the views available in non-intrusive head-mounted cameras (HMC) $\tilde{\mathcal{H}}^t = \{H_i^t\}_{i\in C'}$, d where |C'|=3. The retained views and their corresponding parameters form the training data $\{(\tilde{\mathcal{H}}^t, z^t)\}_{t\in\mathcal{T}}$ that may be used for training the real-time regressor 312 that will be used during real-time animation.

In particular embodiments, rather than minimizing $L_2$-loss in the latent space of $z^t$, loss may be measured in a way that encourages the network to spend capacity on the most visually sensitive parts, such as subtle lip shape and gaze direction. Additionally, the error in geometry and texture map, particularly in eye and mouth regions, may be minimized, because the avatar may have insufficient geometry detail, and may thus rely on view-dependent texture to be photorealistic in these regions. A regressor $\tilde{E}_{\tilde{θ}}$ may be built to convert $\tilde{\mathcal{H}}^t$ to target $z^t$:

$$\min_{\tilde{θ}} \sum_t \|z^t - \tilde{z}^t\|^2 + λ_1\|M^t - \tilde{M}^t\|^2 + λ_2\|κ(T_0^t) - κ(\tilde{T}_0^t)\|^2, \quad (15)$$

where $$\tilde{z}^t = \tilde{E}_{\tilde{θ}}(\tilde{\mathcal{H}}^t) \quad (16)$$

$$\tilde{M}^t, \tilde{T}_0^t \leftarrow D(\tilde{z}^t, v_0) \quad (17)$$

$$M^t, T_0^t \leftarrow D(z^t, v_0), \quad (18)$$

and κ is the crop on texture maps focusing on eye and mouth area (shown in FIG. 7), and $v_0$ is a fixed frontal view of the avatar.

In particular embodiments, it is desirable for the architectural design of the real-time tracking model $\tilde{E}_{\tilde{θ}}$ 318 to provide good fitting to target $z^t$, be robust against real-world variations such as surrounding illumination and headset wearing position, and achieve real-time or near-real-time inference speed. These criteria are different from the avatar parameter extraction model $E_Θ$ 206, whose function relates to learning (e.g., overfitting) a $z^t$ and $v^t$ that minimize Equation (5). Therefore, smaller input images (e.g., 192×192 or the like) and a smaller number of convolutional filters and layers may be used for $\tilde{E}_{\tilde{θ}}$, compared to $E_Θ$. The architectural design may be similar: 3 separated branches of convolutional networks may be built to convert $\tilde{\mathcal{H}}^t_i$ to 3 one-dimensional vectors, since input images are observing different parts of the face and hence do not necessarily share spatial structure. Finally, these one-dimensional vectors may be concatenated and converted to $z^t$ through a multilayer perceptron. During training, input images may be augmented with a random small angle homography to simulate camera rotation to account for manufacturing error of camera mounting, as well as directional image intensity histogram perturbation to account for lighting variation.

Given that $\tilde{E}$ and D can both be evaluated in real-time, a two-way social virtual-reality (VR) system may be built, in which both users may see high-fidelity animations of each other's personalized avatar while wearing head-mounted cameras such as on the non-intrusive headset 420. On one side, a computing node may run $\tilde{E}$ of a first user on one GPU and send encoded $z^t$ over to the other side via a communication network. At the same time, the computing node may receive $z^t$ of a second user from another side via the communication network, run D of the second user, and render stereo images (for left and right eyes) of the second user's avatar on a second GPU.

Figure 6A:
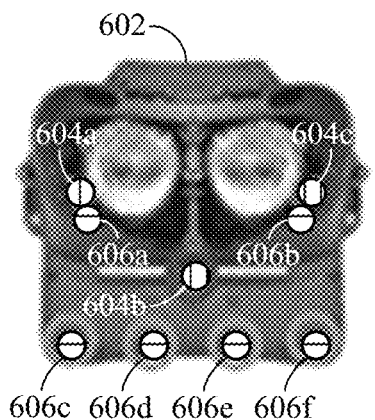
FIG. 6A illustrates an example training headset having intrusive and non-intrusive infrared cameras.
Figure 6B:
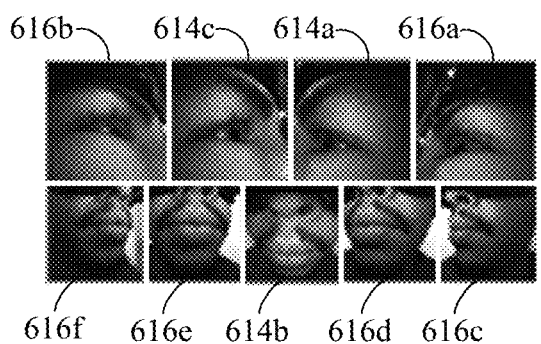
FIG. 6B illustrates example images generated by a training headset.

FIG. 6A illustrates an example training headset 602 having intrusive and non-intrusive infrared cameras. The training head-mounted display (HMD) 602 includes augmented cameras 606a-f and standard cameras 604a-c The HMD 602 may be used for collecting data to help establish better correspondence between HMD images and avatar parameters. Particular embodiments use two versions of the same headset design: a non-intrusive, consumer-friendly design with a minimally intrusive camera configuration, and a training design with an augmented camera set having more accommodating viewpoints to support finding correspondences. The augmented training headset 602 may be used to collect data and build a mapping between the non-intrusive headset camera configuration and the user's facial expressions. Specifically, the non-intrusive cameras 604 may include a VGA-resolution camera for each of the mouth 604b, left-eye 604c, and right-eye 604a. The six augmented cameras 606 add an additional view 606a,b to each eye as well as four additional views 606c-f of the mouth, strategically placed lower to capture lip-touching and vertical mouth motion, and on either side to capture lip protrusion. The cameras 604, 606 are synchronized and capture at 90 Hz in this example. The cameras 604, 606 may be geometrically calibrated together using a custom printed 3D calibration pattern 640 to ensure that part of the pattern is within the depth of field of each camera. To build a training dataset, each subject may be captured using the same stimuli: once using modeling sensors such as the RGB cameras 106, and once using the augmented tracking sensors 604, 606. The stimuli may include, e.g., 70 expressions, 50 sentences, a range of motion, a range of gaze directions, and 10 minutes of free conversation. This stimuli is designed to cover the range of natural expressions. Collecting the same content using both devices provides a roughly balanced distribution of facial expressions between the two domains for use as input to unpaired domain transfer algorithms. FIG. 6B illustrates example images 614, 616 captured by the training headset 602. The captured images include non-intrusive frames 614a-c, which may be captured by the non-intrusive cameras 604a-c, respectively, and augmented frames 616a-f, which may be captured by the augmented cameras 606a-f, respectively.

Figure 6C:
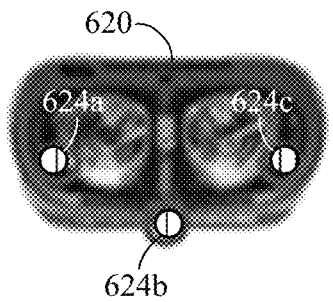
FIG. 6C illustrates an example tracking headset having non-intrusive infrared cameras.
Figure 6D:
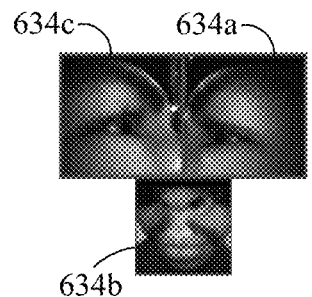
FIG. 6D illustrates example images generated by a tracking headset.

FIG. 6C illustrates an example tracking headset 620 having non-intrusive infrared cameras. The tracking head-mounted display 620 includes standard cameras 624a-c, which may correspond in positions (e.g., relative to a wearer's face) to standard cameras 604a-c of the training head-mounted display 602. The tracking head-mounted display 620 may be used for real-time or near-real-time face animation with a minimized camera configuration. FIG. 6D illustrates example images 634 generated by the tracking headset 620. Captured images 634 includes non-intrusive frames 634a-c, which may be captured by the non-intrusive cameras 624a-c, respectively. The IR images 634a-c captured by the non-intrusive headset 620 may correspond, at least in terms of camera point-of-view, to the IR images 614a-c captured by the training headset.

Figure 6E:
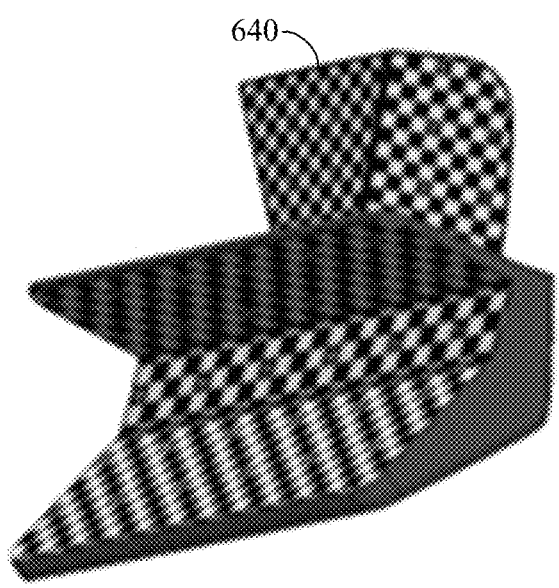
FIG. 6E illustrates an example multi-plane calibration pattern used to calibrate cameras in training and tracking headsets.

FIG. 6E illustrates an example multi-plane calibration pattern 640 used to calibrate cameras in training and tracking headsets. The multi-plane calibration pattern 640 may be used to geometrically calibrate cameras 624a-c in the non-intrusive headset 620 with corresponding respective cameras 604a-c in the training headset 602, so that the points-of-view from which the IR images 634a-c are captured by the non-intrusive headset 620 correspond to the points-of-view from which the corresponding respective training headset IR images 614a-c are captured.

Figure 6F:
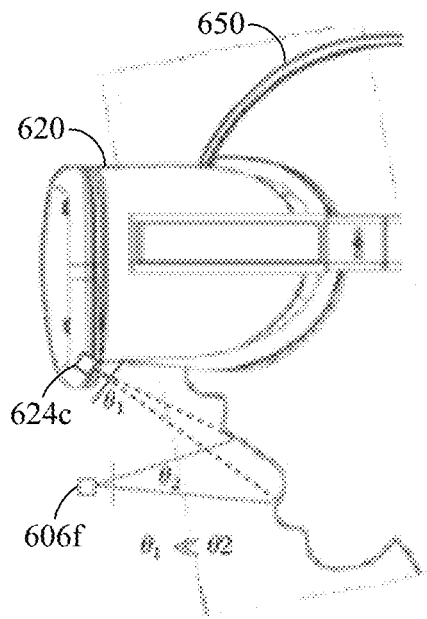
FIG. 6F illustrates examples of challenges in ergonomic camera placement on a headset.

FIG. 6F illustrates examples of challenges in ergonomic camera placement on a headset 620. As shown, for cameras mounted on a headset 620 worn by a user 650, large motions such as mouth opening project to small changes in the image captured by a non-intrusive camera 624c. In comparison, camera placements that are more intrusive for the user 650 may be more accommodating for the training process. For example, for the camera 606f placed more directly in front of the mouth, large motions such as the mouth opening correspond to large changes in the captured image, and the large changes in the captured image may be used to more effectively train the machine-learning models described herein.

FIG. 7 illustrates example landmarks on a texture map of an avatar and head-mounted camera images. Colors of landmarks indicate the correspondence across HMC images 701, 702, 703 and texture map 700. Landmarks may be detected in 9 views (only 3 views are shown) from a detector trained by human annotation. The uv-coordinates of these landmarks may be jointly solved with $z^t$ and $v^t$ across multiple frames. Note that the projected distance of landmarks is not necessarily minimized in the overall optimization of Equation (5) to find correspondence. Landmarks on the image 701 include left eye landmarks 726a,b, which correspond to respective landmarks 706a,b on the texture map 700. Landmarks on the image 703 include right eye landmarks 724a,b, which correspond to respective landmarks 704a,b on the texture map 700. Landmark images on the lower face image 702 include left nostril landmarks 728, 732, which correspond to respective landmarks 708, 712 on the texture map 700. The lower face image 705 also includes right nostril landmark 730 and mouth landmarks 734a, 734b, which correspond to respective landmarks 710, 714a, and 714b on the texture map 700.

FIG. 8 illustrates example matching of the distribution of spatial structures of images in different spectral domains. The statistical distributions of spatial structures of captured images in the IR domain may be matched with those of rendered avatar images 804 in the RGB domain. An approximated distribution of spatial structures $\hat{P}(z, v)$ 808 may be estimated using landmark detection on captured HMC images 802 for the head pose distribution $\hat{P}(v)$ and using RGB images captured by RGB modeling cameras for the facial expression distribution $\hat{P}(z)$. The actual distribution $\hat{P}(z)$ of facial expressions z is assumed to be statistically comparable to the distribution $\hat{P}(z)$ from the modeling camera capture for building the avatar, given common stimuli for subjects. The distribution to which images are to conform may then be determined as $\hat{P}(z, v) = \hat{P}(z)\hat{P}(v)$.

FIG. 9 illustrates example cross-view cycle consistency in multi-view image domain translation between different spectral domains. In addition to cross-domain cycle consistency within each domain, the domain transformer may be further constrained given paired multiview data in each domain, to encourage preserving spatial structure of the face images. Only one loss term (out of 4 possible directions, as in Equation (11)) is shown in FIG. 9. The views include a first view 902, labeled "view 0", which corresponds to a first frame, and a second view 904, labeled "view 1", which corresponds to a second frame. The first view 902 includes frames 910, 912. The second view 904 includes images 914, 916. Cross-view consistency may be evaluated between the views 902, 904. The domains include Domain H 906, which corresponds to the HMC images 106, and Domain R 908, which corresponds to the domain-transferred images 502. Domain H 906 includes frames 910, 914, and Domain R includes frames 912, 916. Translation from Domain H to R is via F, and translation from domain R to H is via G. Further, translation from view 0 to view 1 is via $P_0$, and translation from view 1 to view 0 is via $P_1$. A cycle may be established between Domains H and R via F and G, and a cycle may be established between views 0 and 1 via $P_0$ and $P_1$. The loss between domains and views may be calculated and minimized while training F and G.

FIG. 10 illustrates an example algorithm for training for multi-view image domain translation. Algorithm 1 may receive unpaired HMC images H 106 and rendered images R 506 as input, with one of the images H and one of the images R in a first view and the other images H and R in a second view. The algorithm may generate converged $F_\phi$ and $G_\psi$, 114 as output. The algorithm may repeat the following steps until $F_\phi$ and $G_\psi$ 114 are converged: sample (t, s) to get $H_i^t$, $R_i^s$ for $i \in \{0, 1\}$ (4 images), update $\phi$ for F using gradients minimizing $L_{CH}+L_{GH}+L_{VH}$, update $\psi$ for G using gradients minimizing $L_{CR}+L_{GR}+L_{VR}$, update P using gradients minimizing $L_P$, and update $D_H$ and $D_R$ using gradients maximizing $L_G$.

FIG. 11 illustrates example background-aware differentiable rendering. In this example, differentiable rendering is performed on an input HMC image 1102 of a puffed cheek. A domain-transferred (target) image 1104 may be produced. A current rendered avatar 1106 is also shown. A larger image shows the result of overlaying images 1104 and 1106. Pixels in box 1110 are currently rendered as background pixels but should be rendered as foreground pixels. A closer look at pixels around the face contour is shown in box 1110. For a background pixel p within a bounding box 1110 of any projected triangle (dashed rectangle), such as triangle 1114, the p's color is blended from color $C_t$ at the closest point on the closest edge $p\ 1\ p\ 2$ and background color$c_b$, with a weighting related to distance $d_p$. The arrows pointing downward and to the right indicate that the gradient generated from dark gray pixels can be back-propagated to geometry of the face.

Figure 12:
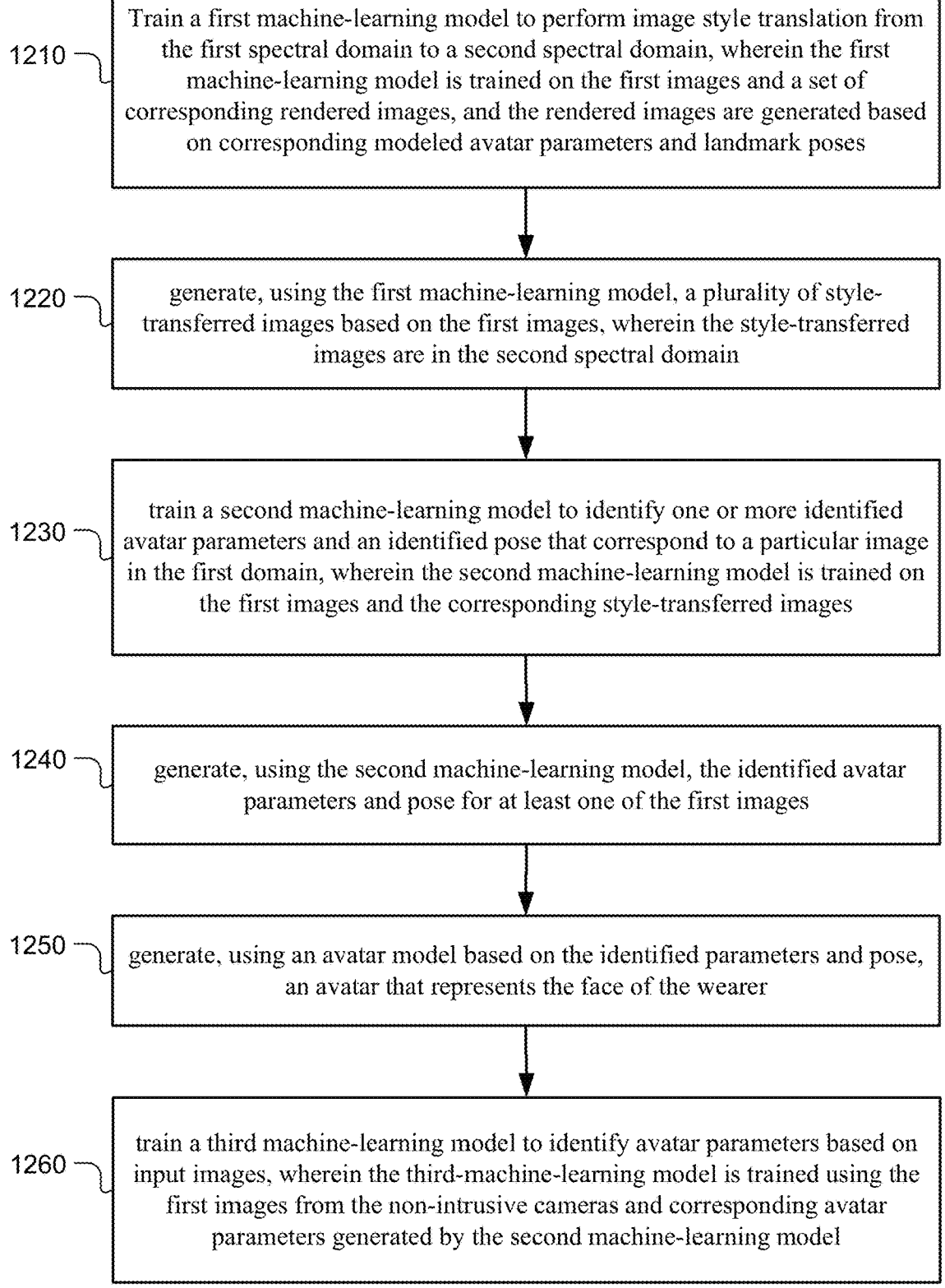
FIG. 12 illustrates an example method for establishing correspondence between infrared images and avatar parameters.

FIG. 12 illustrates an example method 1200 for establishing correspondence between infrared images and avatar parameters. The method may begin at step 1210, where the method may train a first machine-learning model to perform image domain translation from the first spectral domain to a second spectral domain, wherein the first machine-learning model is trained on the first images and a set of corresponding rendered images, and the rendered images are generated based on corresponding modeled avatar parameters and landmark poses. At step 1220, the method may generate, using the first machine-learning model, a plurality of domain-transferred images based on the first images, wherein the domain-transferred images are in the second spectral domain. At step 1230, the method may train a second machine-learning model to identify one or more identified avatar parameters and an identified pose that correspond to a particular image in the first domain, wherein the second machine-learning model is trained on the first images and the corresponding domain-transferred images. At step 1240, the method may generate, using the second machine-learning model, the identified avatar parameters and pose for at least one of the first images. At step 1250, the method may generate, using an avatar model based on the identified parameters and pose, an avatar that represents the face of the wearer. At step 1260, the method may train a third machine-learning model to identify avatar parameters based on input images, wherein the third-machine-learning model is trained using the first images from the non-intrusive cameras and corresponding avatar parameters generated by the second machine-learning model.

Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for establishing correspondence between infrared images and avatar parameters including the particular steps of the method of FIG. 12, this disclosure contemplates any suitable method for establishing correspondence between infrared images and avatar parameters including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Figure 13:
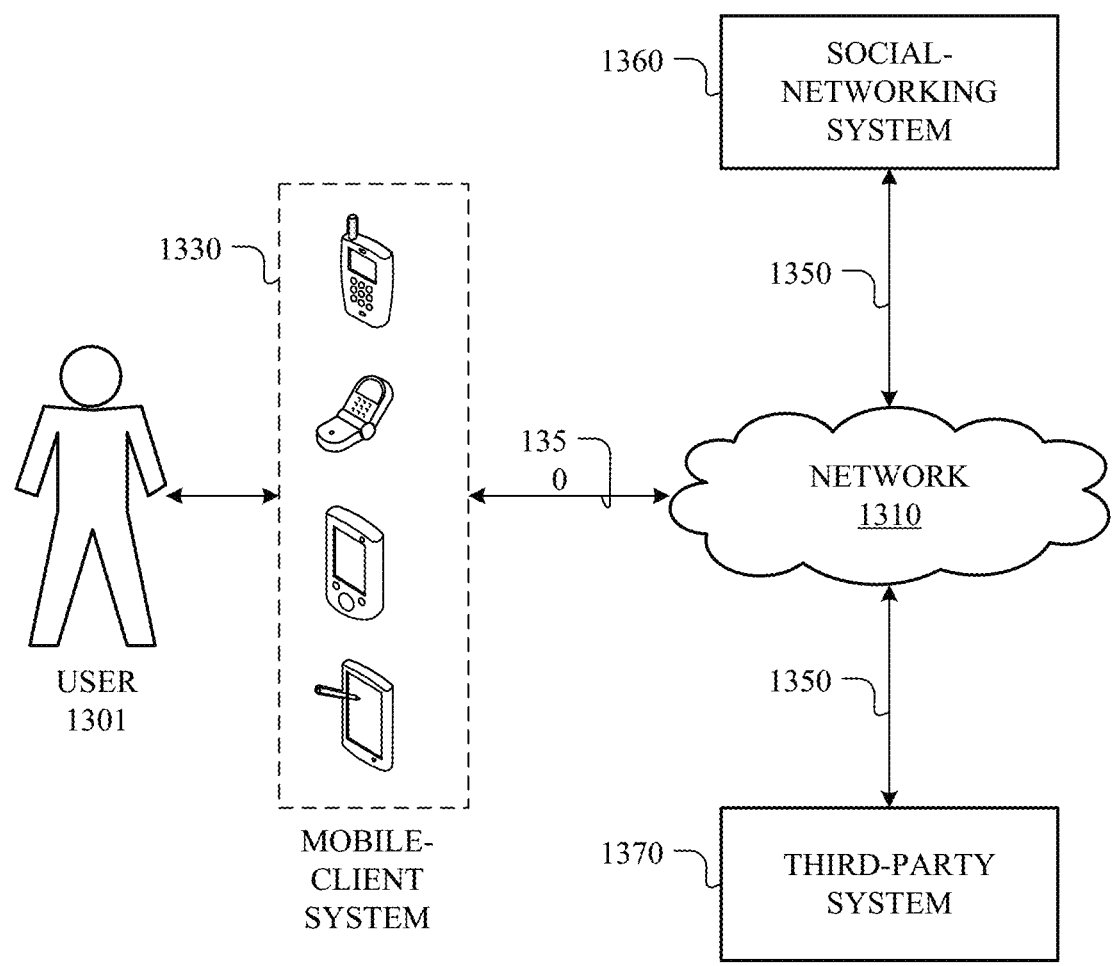
FIG. 13 illustrates an example networking environment.

FIG. 13 illustrates an example network environment 1300 associated with a social-networking system. Network environment 1300 includes a user 1301, a client system 1330, a social-networking system 1360, and a third-party system 1370 connected to each other by a network 1310. Although FIG. 13 illustrates a particular arrangement of user 1301, client system 1330, social-networking system 1360, third-party system 1370, and network 1310, this disclosure contemplates any suitable arrangement of user 1301, client system 1330, social-networking system 1360, third-party system 1370, and network 1310. As an example and not by way of limitation, two or more of client system 1330, social-networking system 1360, and third-party system 1370 may be connected to each other directly, bypassing network 1310. As another example, two or more of client system 1330, social-networking system 1360, and third-party system 1370 may be physically or logically co-located with each other in whole or in part. Moreover, although FIG. 13 illustrates a particular number of users 1301, client systems 1330, social-networking systems 1360, third-party systems 1370, and networks 1310, this disclosure contemplates any suitable number of users 1301, client systems 1330, social-networking systems 1360, third-party systems 1370, and networks 1310. As an example and not by way of limitation, network environment 1300 may include multiple users 1301, client system 1330, social-networking systems 1360, third-party systems 1370, and networks 1310.

In particular embodiments, user 1301 may be an individual (human user), an entity (e.g., an enterprise, business, or third-party application), or a group (e.g., of individuals or entities) that interacts or communicates with or over social-networking system 1360. In particular embodiments, social-networking system 1360 may be a network-addressable computing system hosting an online social network. Social-networking system 1360 may generate, store, receive, and send social-networking data, such as, for example, user-profile data, concept-profile data, social-graph information, or other suitable data related to the online social network. Social-networking system 1360 may be accessed by the other components of network environment 1300 either directly or via network 1310. In particular embodiments, social-networking system 1360 may include an authorization server (or other suitable component(s)) that allows users 1301 to opt in to or opt out of having their actions logged by social-networking system 1360 or shared with other systems (e.g., third-party systems 1370), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. Third-party system 1370 may be accessed by the other components of network environment 1300 either directly or via network 1310. In particular embodiments, one or more users 1301 may use one or more client systems 1330 to access, send data to, and receive data from social-networking system 1360 or third-party system 1370. Client system 1330 may access social-networking system 1360 or third-party system 1370 directly, via network 1310, or via a third-party system. As an example and not by way of limitation, client system 1330 may access third-party system 1370 via social-networking system 1360. Client system 1330 may be any suitable computing device, such as, for example, a personal computer, a laptop computer, a cellular telephone, a smartphone, a tablet computer, or an augmented/virtual reality device.

This disclosure contemplates any suitable network 1310. As an example and not by way of limitation, one or more portions of network 1310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1310 may include one or more networks 1310.

Links 1350 may connect client system 1330, social-networking system 1360, and third-party system 1370 to communication network 1310 or to each other. This disclosure contemplates any suitable links 1350. In particular embodiments, one or more links 1350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1350, or a combination of two or more such links 1350. Links 1350 need not necessarily be the same throughout network environment 1300. One or more first links 1350 may differ in one or more respects from one or more second links 1350.

Figure 14:
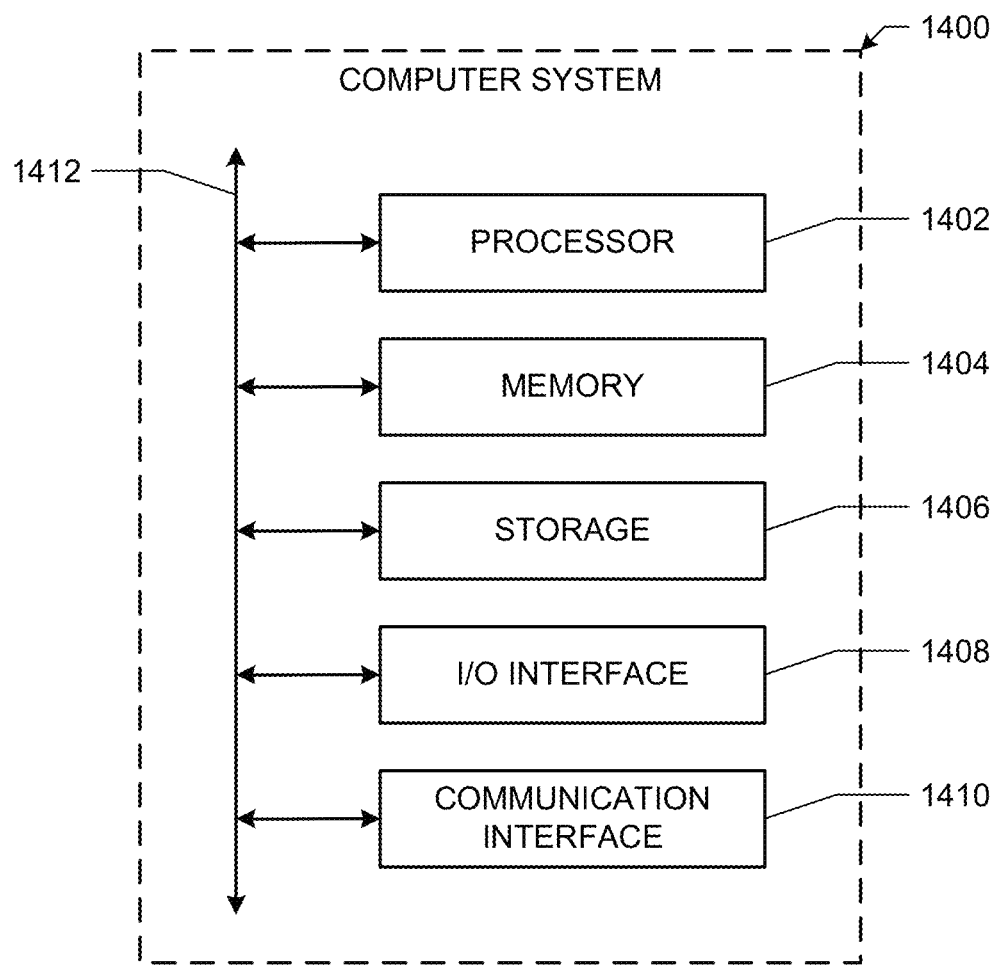
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real-time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system comprising:
one or more non-transitory computer-readable storage media embodying instructions;
one or more processors coupled to the storage media and operable to execute the instructions to:
access a plurality of first captured images of a user that are captured in a first spectral domain;
generate, using a first machine-learning model, a plurality of first domain-transferred images based on the first captured images, wherein the first domain-transferred images are in a second spectral domain;
render, based on a first avatar, a plurality of first rendered images comprising views of the first avatar, the first avatar being a virtual representation of the user; and
update the first machine-learning model based on comparisons between the first domain-transferred images and the first rendered images, wherein the updated first machine-learning model is configured to translate images in the first spectral domain to the second spectral domain.

2. The system of claim 1, wherein the processors are further operable to execute the instructions to:
generate, using a second machine-learning model, the first avatar based on the first captured images.

3. The system of claim 1, wherein the first avatar is rendered using a parametric face model based on a plurality of avatar parameters.

4. The system of claim 3, wherein a distribution of the avatar parameters in the first domain-transferred images corresponds to a distribution of the avatar parameters in the first rendered images.

5. The system of claim 1, wherein the first machine-learning model is updated using a loss function based on a difference between each first domain-transferred image and each corresponding first rendered image.

6. The system of claim 5, wherein the loss function is further based on one or more spatial relationships between cameras that capture the images.

7. The system of claim 1, wherein the processors are further operable to execute the instructions to:
access a plurality of second captured images that are captured in the first spectral domain;
generate, using the updated first machine-learning model, a plurality of second domain-transferred images based on the second captured images, wherein the second domain-transferred images are in the second spectral domain;
generate, using a second machine-learning model, a second avatar based on the second captured images;

render, based on the second avatar, a plurality of second rendered images comprising views of the second avatar; and update the second machine-learning model based on comparisons between the second domain-transferred images and the second rendered images, wherein the second machine-learning model is configured to generate, based on one or more first input images, one or more avatar parameters for rendering avatars that correspond to the first input images.

8. The system of claim 7, wherein the updated second machine-learning model is further configured to generate, based on the one or more first input images, pose information that represents spatial orientation of the avatars.

9. The system of claim 7, wherein the first and second captured images are captured by cameras associated with a training headset.

10. The system of claim 7, wherein the processors are further operable to execute the instructions to:

access a plurality of third captured images, wherein the third captured images are from a subset of the second captured images;

generate, using the updated second machine-learning model, avatar parameters that correspond to the third captured images; and train, based on the correspondence between the third captured images and the corresponding avatar parameters, a third machine-learning model to generate, based on one or more second input images, one or more avatar parameters that correspond to the second input images.

11. The system of claim 10, wherein the third machine-learning model generates the output avatar parameters in real-time.

12. The system of claim 10, wherein the third captured images are captured by a plurality of training cameras associated with a training headset, and the second input images are captured by a plurality of non-intrusive cameras associated with a non-intrusive headset.

13. The system of claim 12, wherein positions of the non-intrusive cameras on the non-intrusive headset correspond to positions of a subset of the training cameras on the training headset.

14. The system of claim 10, wherein the third machine-learning model comprises:

a plurality of convolutional neural network branches that generate one-dimensional vectors, wherein each branch corresponds to a camera and converts received images captured by the corresponding camera in the first spectral domain to a corresponding one of the one-dimensional vectors; and a multilayer perceptron that converts the vectors to avatar parameters.

15. The system of claim 10, wherein the processors are further operable to execute the instructions to:

access a plurality of third images captured in the first spectral domain, wherein the third images are captured by non-intrusive cameras, the second images are captured by intrusive cameras, and the non-intrusive cameras are fewer in number than the intrusive cameras;

generate, using the third machine-learning model, avatar parameters based on the third images;

render, based on the avatar parameters, a plurality of third rendered images comprising views of a third avatar; and present, to a user, the third rendered images.

16. The system of claim 10, wherein the system further comprises first and second Graphics Processing Units (GPUs), and the processors are further operable to execute the instructions to:

access a plurality of images of a first user that are captured in the first spectral domain;

generate, by executing the third machine-learning model on the first GPU, first avatar parameters based on the images of the first user; and send, via a communication network, the first avatar parameters to a computing device of a second user.

17. The system of claim 16, wherein the processors are further operable to execute the instructions to:

receive, via the communications network, second avatar parameters from the computing device of the second user;

render, using the second GPU and based on the second avatar parameters, a plurality of third rendered images comprising views of an avatar of the second user; and present, to the first user, the third rendered images.

18. The system of claim 1, wherein the first spectral domain is infrared, and the second spectral domain is visible light.

19. One or more computer-readable non-transitory storage media embodying software that is operable when executed to:

access a plurality of first captured images of a user that are captured in a first spectral domain;

generate, using a first machine-learning model, a plurality of first domain-transferred images based on the first captured images, wherein the first domain-transferred images are in a second spectral domain;

render, based on a first avatar, a plurality of first rendered images comprising views of the first avatar, the first avatar being a virtual representation of the user; and update the first machine-learning model based on comparisons between the first domain-transferred images and the first rendered images, wherein the updated first machine-learning model is configured to translate images in the first spectral domain to the second spectral domain.

20. A method comprising:

by a computing device, accessing a plurality of first captured images of a user that are captured in a first spectral domain;

by the computing device, generating, using a first machine-learning model, a plurality of first domain-transferred images based on the first captured images, wherein the first domain-transferred images are in a second spectral domain;

by the computing device, rendering, based on a first avatar, a plurality of first rendered images comprising views of the first avatar, the first avatar being a virtual representation of the user; and by the computing device, updating the first machine-learning model based on comparisons between the first domain-transferred images and the first rendered images, wherein the updated first machine-learning model is configured to translate images in the first spectral domain to the second spectral domain.

* * * * *